(No Model.)

J. T. WATSON.
AUTOMATIC SHAFT TUG.

No. 296,899. Patented Apr. 15, 1884.

WITNESSES
F. L. Durand
E. J. Siggers

INVENTOR
James T. Watson
by C. A. Snow & Co.
Attorneys

UNITED STATES PATENT OFFICE.

JAMES T. WATSON, OF ST. LOUIS, MISSOURI, ASSIGNOR OF THREE-FOURTHS TO RICHARD T. BISHOP, OF SAME PLACE, AND JEAN C. BOHRER, OF ST. PAUL, MINNESOTA.

AUTOMATIC SHAFT-TUG.

SPECIFICATION forming part of Letters Patent No. 296,899, dated April 15, 1884.

Application filed February 7, 1884. (No model.)

*To all whom it may concern:*

Be it known that I, JAMES T. WATSON, a citizen of the United States, residing at St. Louis, in the county of St. Louis and State of Missouri, have invented a new and useful Automatic Shaft-Tug, of which the following is a specification, reference being had to the accompanying drawings.

This invention relates to automatic shaft-tugs; and it has for its object to facilitate the hitching and unhitching of horses to buggies and other vehicles.

A further object of the invention is to prevent the tug from chafing or wearing the shaft while in use; and a still further object is to provide a simple, convenient, and inexpensive device, which, when the girth is drawn tight, will close firmly around the shafts, but on releasing the girth the tugs will open and allow the shafts to be lifted out without trouble.

With these and other objects in view, the said invention consists in combining with the back-band and girth of suitable pivoted hooks connected, respectively, to the back-band and girth on each side of the horse, so that when the girth is buckled together the hooks on each side will clasp or fit around the shafts.

It consists, further, in details of construction and combination of parts, as hereinafter set forth, and particularly pointed out in the claims.

Figure 1:
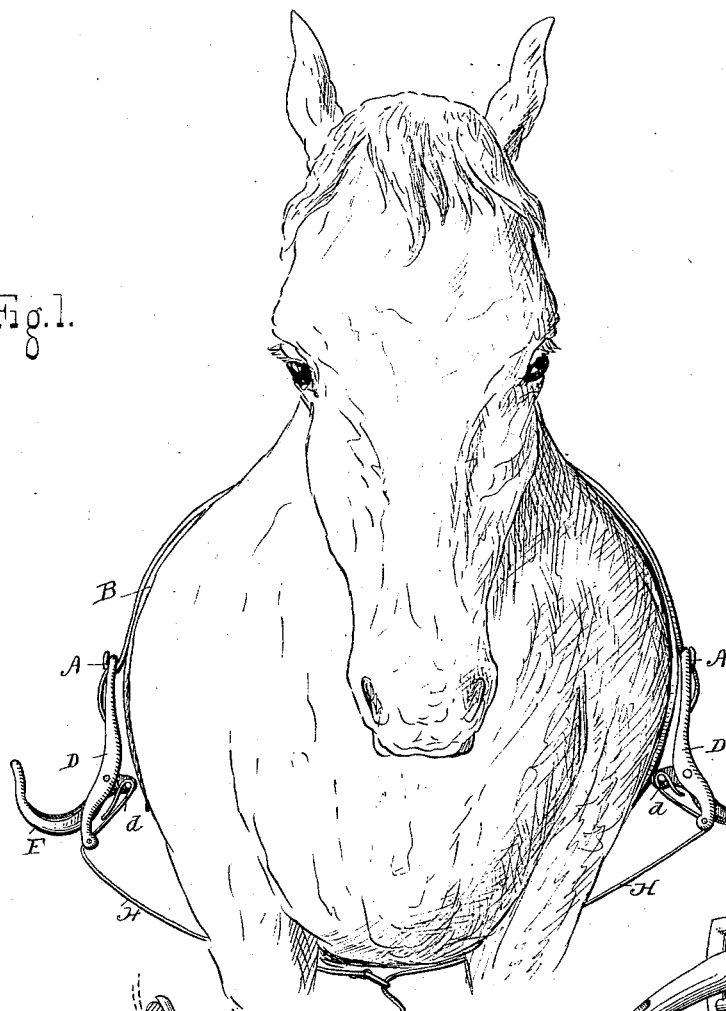
Figure 3:
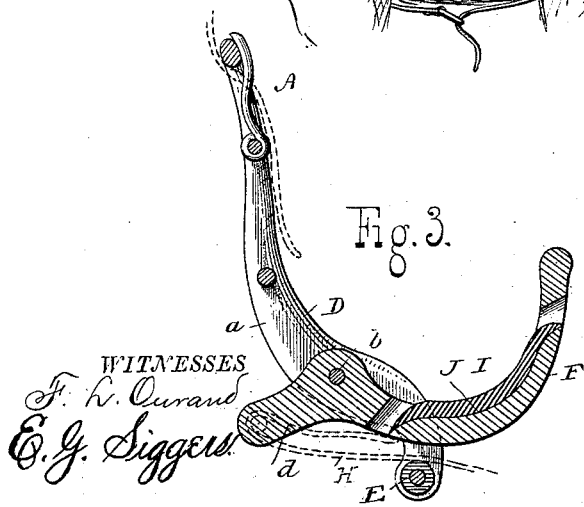
Figure 2:
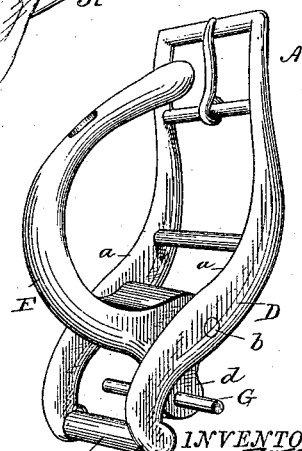

In the accompanying drawings, Figure 1 is a perspective view, showing my improved device in use. Fig. 2 is a detail perspective view of the shaft-tug. Fig. 3 is a vertical sectional view of the same.

Like letters refer to corresponding parts in the several figures.

Referring to the drawings, A designates the saddle or pad, and B the back-band, arranged and constructed in the usual manner. A buckle, A, is attached to the ends of the back-band on each side, and is formed with a downward extension, D, curving outwardly, as shown, the outer end of the extension being provided with a roller, E.

Between the side bars or cheeks $a$ of the extension is pivoted a hook, F, by means of a rivet or bolt, $b$, the lower end of the hook curving downwardly, as at $d$, and provided with a cross-bar, G, the girth H being formed with a loop at each end to clasp the cross-bar G, and pass over the roller E, the ends of the girth being buckled under the horse in the usual manner.

The operation of my invention will be readily understood from the foregoing description, taken in connection with the annexed drawings.

The shaft-tug is applied to each side of the back-band in the manner shown, each end of the girth being attached to the lower end of the hook, and extending under the horse, and buckled together in the usual manner. When the girth is drawn tight, the hooks of each side will close firmly around the shafts, and on releasing the girth both hooks will open and allow the ready withdrawal of the shafts. By this means I am enabled to facilitate the hitching and unhitching of horses to buggies and other vehicles.

To prevent the hooks from chafing or wearing the shafts, I provide a piece of rubber or leather, I, to fit in a groove or recess, J, of each hook, as shown in Fig. 3.

It will be seen that my improved tug will hold the shafts in an efficient manner, and in the event of the breeching becoming broken, there will be no danger of the vehicle running on the horse.

The buckle A provides a simple means for attaching my improved shaft-tug to any harness in a very short space of time.

My improved shaft-tug is simple and durable in construction, convenient in use, and efficient in operation. It may be constructed of brass, iron, or other suitable material in any desired form, and I therefore do not limit myself to the precise details of construction.

It will be apparent that the device shown will fill a long-felt want in this class of articles. The action is automatic, since the moment the girth is unbuckled the shafts are released, and by simply buckling the girth the shafts will be supported in a safe and efficient manner.

Other advantages are attained by the use of my invention, but it is not necessary to give them here.

Having described my invention, I claim—

1. In an automatic shaft-tug, the combination, with the back-band, of pivoted hooks connected thereto, and the girth attached to the hooks, said devices operating in the manner described, so that when the girth is buckled together the hooks will close around the shafts, as set forth.

2. In an automatic shaft-tug, the combination, with the back-band and girth, of hooks adapted to fit around the shafts, said hooks being operated by buckling the girth, as set forth.

3. In an automatic shaft-tug, the combination, with the back-band, of an extension attached to the back-band on each side, hooks pivoted in the extensions, and the girth attached to the ends of the hooks, and operating as described, for the purpose set forth.

4. In an automatic shaft-tug, the combination, with the back-band, of a buckle attached to the same, and provided with a downward extension, hooks pivoted in the extensions, and the girth attached to the ends of the hooks, as set forth.

5. In an automatic shaft-tug, the combination, with the back-band, of a buckle attached to the ends of the same, and provided with downward extensions, a roller fitted in the end of the extension, hooks pivoted in the extensions, and the girth attached to the ends of the hooks and passing over the rollers, as set forth.

6. As an improved article of manufacture, the herein-described shaft-tug, comprising a buckle provided with a downward extension, the latter having a roller at the lower end thereof, a hook pivoted in the extension, and a cross-bar at the lower end of the hook, arranged and operating for the purpose set forth.

In testimony that I claim the foregoing as my own I have hereto affixed my signature in presence of two witnesses.

JAMES T. WATSON.

Witnesses:
RICHARD THOS. BISHOP,
SAMUEL BISHOP.